United States Patent
Venkatram et al.

(10) Patent No.: US 11,889,578 B2
(45) Date of Patent: Jan. 30, 2024

(54) UE ASSISTED CDRX FALLBACK

(71) Applicant: QUALCOMM Incorporated, San Diego, CA (US)

(72) Inventors: Karthik Venkatram, San Diego, CA (US); Kuo-Chun Lee, San Diego, CA (US); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/214,742

(22) Filed: Mar. 26, 2021

(65) Prior Publication Data
US 2022/0312542 A1    Sep. 29, 2022

(51) Int. Cl.
*H04W 76/28*    (2018.01)
*H04W 52/02*    (2009.01)

(52) U.S. Cl.
CPC ....... *H04W 76/28* (2018.02); *H04W 52/0225* (2013.01); *H04W 52/0277* (2013.01)

(58) Field of Classification Search
CPC ......... H04W 52/0277; H04W 52/0225; H04W 76/28
See application file for complete search history.

(56) References Cited

U.S. PATENT DOCUMENTS

| | | | | |
|---|---|---|---|---|
| 2008/0181127 A1* | 7/2008 | Terry | ................ | H04W 52/0235 370/252 |
| 2010/0113023 A1* | 5/2010 | Huang | .................. | H04W 76/28 455/450 |
| 2013/0094379 A1* | 4/2013 | Xu | ..................... | H04W 52/0209 370/252 |
| 2013/0301500 A1* | 11/2013 | Koc | ....................... | H04W 24/02 370/311 |
| 2017/0013557 A1* | 1/2017 | Koc | ....................... | H04W 4/16 |

(Continued)

FOREIGN PATENT DOCUMENTS

| | | |
|---|---|---|
| EP | 3171528 A1 | 5/2017 |
| WO | WO-2021160495 A1 * | 8/2020 |

OTHER PUBLICATIONS

Apple Inc: "UE Power Saving Techniques", 3GPP Draft, 3GPP TSG-RAN WG1 Meeting #96, R1-1902771, Power Saving Techniques Based on UE Adaptation, 3GPP, vol. RAN WG1, No. Athens, Greece, Feb. 25, 2019-Mar. 1, 2019, Feb. 16, 2019 (Feb. 16, 2019), XP051600466, pp. 1-15, Retrieved from Internet: URL: http://www.3gpp.org/ftp/tsg%5Fran/WG1%5FRL1/TSGR1%5F96/Docs/R1%2D1902771%2Ezip [retrieved on Feb. 16, 2019] sections 1-3, Sect. 2.1, 2.2. 2.3. 2.7, selections 1 to 2.1.3, figures 4-6.

(Continued)

*Primary Examiner* — Rasheed Gidado
(74) *Attorney, Agent, or Firm* — Procopio, Cory, Hargreaves Savitch LLP

(57) ABSTRACT

Apparatus, methods, and computer program products for DRX adjustment are provided. An example method includes receiving, from a base station, a discontinuous reception (DRX) configuration for the UE based on one or more DRX preferences. The example method further includes adjusting one or more parameters of the DRX configuration in response to a trigger at the UE. The example method further includes transmitting assistance information to the base station, the assistance information including the one or more parameters adjusted by the UE.

34 Claims, 10 Drawing Sheets

(56) References Cited

U.S. PATENT DOCUMENTS

| | | | | |
|---|---|---|---|---|
| 2017/0318536 A1* | 11/2017 | Manepalli | ............. | H04W 24/02 |
| 2020/0186991 A1* | 6/2020 | He | ......................... | H04L 5/1469 |
| 2021/0037473 A1* | 2/2021 | Liu | ......................... | H04W 76/28 |
| 2022/0053593 A1* | 2/2022 | Wang | ................. | H04W 52/0277 |
| 2022/0053594 A1 | 2/2022 | Goel et al. | | |
| 2022/0132417 A1* | 4/2022 | Maleki | .............. | H04W 52/0216 |
| 2022/0191787 A1* | 6/2022 | Shahid | .............. | H04W 52/0212 |
| 2022/0312312 A1* | 9/2022 | Gurumoorthy | ....... | H04W 76/27 |

OTHER PUBLICATIONS

Catt, et al., "Discussion on UE Assistance for SCell Adaptation", 3GPP Draft, 3GPP TSG Ran Meeting #85, RP-192232, 3GPP, vol. TSG RAN, No. Newport Beach, USA, Sep. 16, 2019-Sep. 20, 2019, Sep. 17, 2019 (Sep. 17, 2019), XP051779454, 2 Pages, Retrieved from Internet: URL: http://www.3gpp.org/ftp/Meetings_3GPP_SYNC/RAN/Docs/RP-192232.zip [Retrieved on Sep. 17, 2019] The Whole Document.

International Search Report and Written Opinion—PCT/US2022/017914—ISA/EPO—dated Jun. 8, 2022.

Qualcomm Inc., et al., "UE Assistance Information for Power Saving", 3GPP Draft, 3GPP TSG-RAN WG2 Meeting #107, R2-1911303, UE Assistance Information for Power Saving, 3GPP, vol. RAN WG2, No. Prague, Czech, Aug. 26, 2019-Aug. 30, 2019, Aug. 16, 2019 (Aug. 16, 2019), XP051769060, 3 Pages, Retrieved from Internet: URL: http://www.3gpp.org/ftp/tsg_ran/WG2_RL2/TSGR2_107/Docs/R2-1911303.zip [Retrieved on Aug. 16, 2019] The Whole Document.

Qualcomm Incorporated: et al., "Proposal for UE Assistance Information", 3GPP Draft, 3GPP TSG-RAN2 Meeting #78, R2-122831, Proposal for UE Assistance Information, 3rd Generation Partnership Project (3GPP), vol. RAN WG2, No. Prague, Czech Republic, May 21, 2012-May 25, 2012, May 15, 2012 (May 15, 2012), XP050607415, 4 Pages, [Retrieved on May 15, 2012] The Whole Document.

* cited by examiner

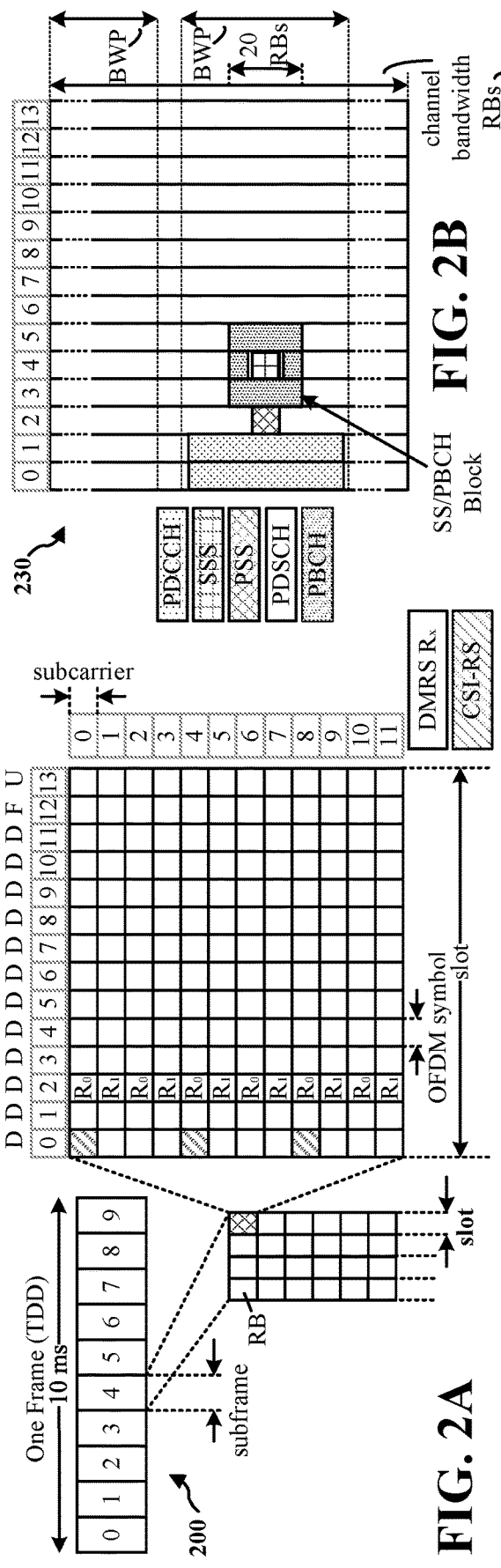
FIG. 2A
FIG. 2B
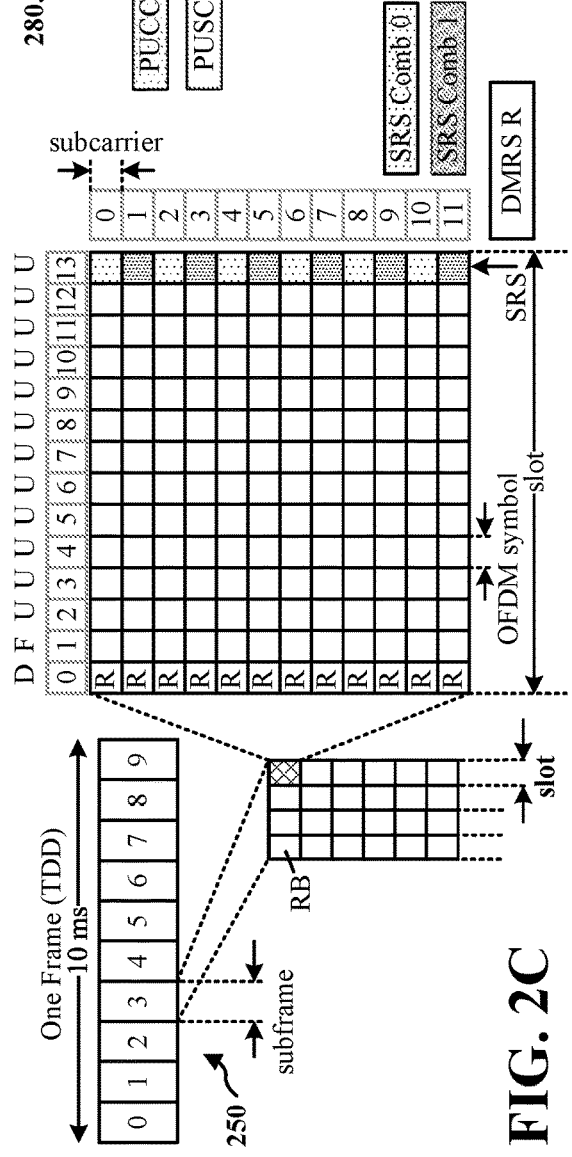
FIG. 2C
FIG. 2D

UE ASSISTED CDRX FALLBACK

BACKGROUND

Technical Field

The present disclosure relates generally to communication systems, and more particularly, to wireless communication systems with discontinuous reception (DRX), such as connected mode DRX (CDRX).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory and configured to receive, from a base station, a DRX configuration for the UE based on one or more DRX preferences. The memory and the at least one processor coupled to the memory may be further configured to adjust one or more parameters of the DRX configuration in response to a trigger at the UE. The memory and the at least one processor coupled to the memory may be further configured to transmit assistance information to the base station, the assistance information including the one or more parameters adjusted by the UE.

In an aspect of the disclosure, a method, a computer-readable medium, and an apparatus at a base station are provided. The apparatus may include a memory and at least one processor coupled to the memory and configured to configure a UE with a DRX configuration based on one or more DRX preferences. The memory ant the at least one processor coupled to the memory may be further configured to receive first assistance information from the UE indicating one or more DRX preferences. The memory ant the at least one processor coupled to the memory may be further configured receive assistance information from the UE, the assistance information including one or more parameters adjusted by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
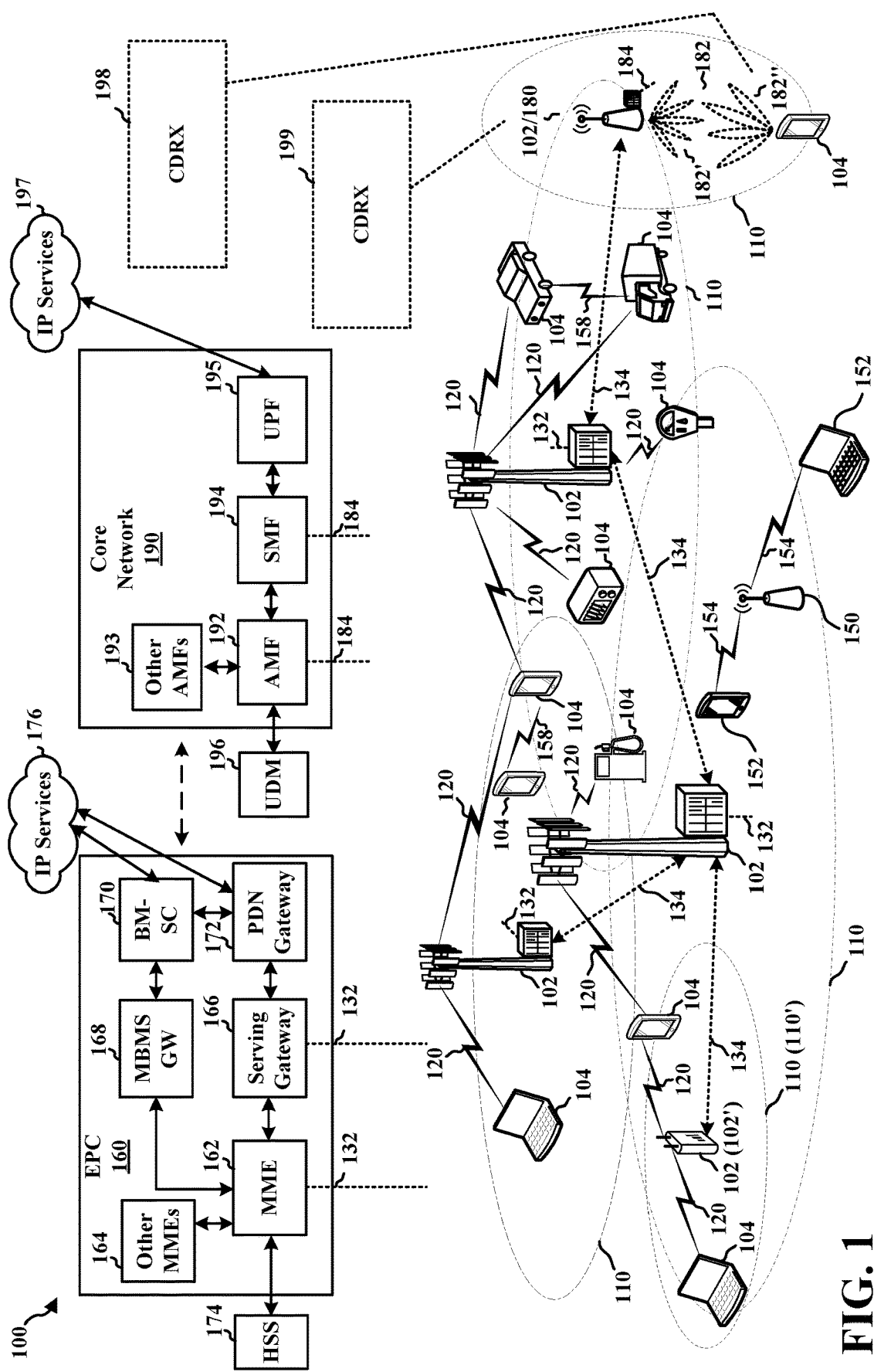
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a CDRX component 198. The CDRX component 198 may be configured to receive, from a base station, a DRX configuration for the UE based on one or more DRX preferences. The CDRX component 198 may be further configured to adjust one or more parameters of the DRX configuration in response to a trigger at the UE. The CDRX component 198 may be further configured to transmit assistance information to the base station, the assistance information including the one or more parameters adjusted by the UE.

In some aspects, the base station 102/180 may include a CDRX component 199, the CDRX component 199 may be configured to configure a UE with a DRX configuration based on one or more DRX preferences. The CDRX component 199 may be further configured to receive assistance information from the UE, the assistance information including one or more parameters adjusted by the UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
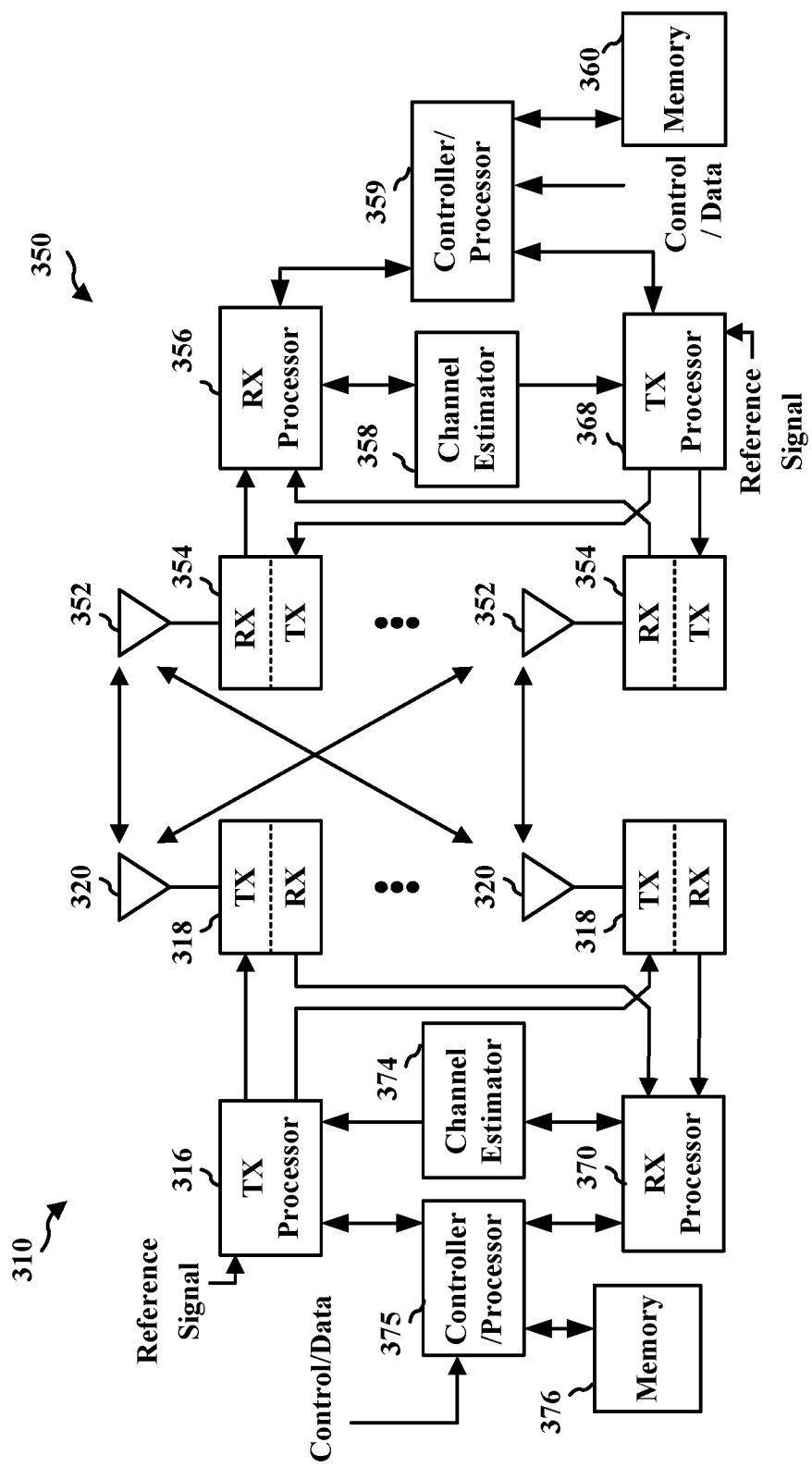
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the CDRX component 198 of FIG. 1.

At least one of the TX processor 316, the RX processor 370, and the controller/processor 375 may be configured to perform aspects in connection with the CDRX component 199 of FIG. 1.

A UE may be configured by a base station for discontinuation reception (DRX). During an RRC connected state, when there is no data transmission in either direction (UL/DL), the UE may operate using the DRX mode. In the DRX mode, the UE starts monitoring the PDCCH channel discontinuously using a sleep and wake cycle. When the UE is in an RRC connected state, the DRX may also be referred to as Connected Mode DRX (C-DRX). DRX may conserve battery power at the UE. In a non-DRX mode, the UE monitors for PDCCH in each subframe to check whether there is downlink data available. Continuous monitoring of the PDCCH may drain the UE's battery power.

Figure 4:
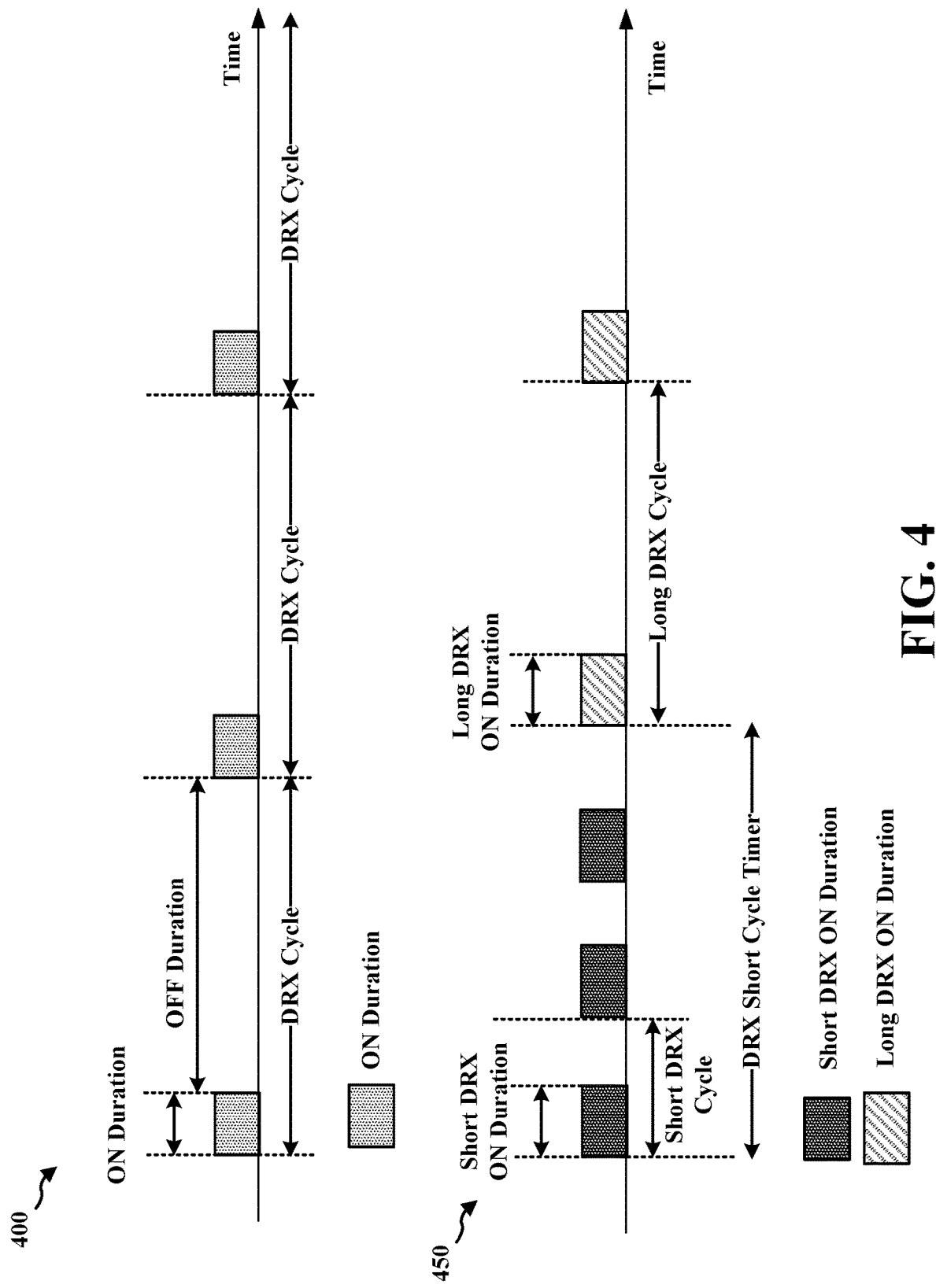
FIG. 4 is a diagram illustrating the discontinuous reception (DRX) process.

The UE's DRX configuration may be configured by the network using RRC signaling from a base station, such as in an RRC Connection Setup request or an RRC connection reconfiguration request. A DRX configuration may include the configuration of one or more timers and values. In some examples, the DRX configuration may include any of an ON duration timer, a DRX inactivity timer, a DRX retransmission timer, a DRX UL retransmission timer, a long DRX cycle, a value of the DRX start offset, a DRX short cycle timer, and/or a short DRX cycle, among others. A DRX cycle may comprise a periodic repetition of an ON duration in which the UE monitors for PDCCH from the base station and an off duration. FIG. 4 illustrates an example of a DRX cycle 400 including periodic ON durations during which the UE monitors for PDCCH and off durations during which the UE may not monitor for the PDCCH. The off duration may be referred to as a DRX opportunity. During the off duration, the UE does not monitor for PDCCH. The UE may enter a sleep mode or a low power mode in which the UE minimizes power consumption by shutting down a radio frequency (RF) function without detecting communication from the base station.

The ON duration timer may correspond to a number of consecutive PDCCH subframes to be monitored or decoded when the UE wakes up from the off duration in the DRX Cycle. The DRX retransmission timer may correspond to a consecutive number of PDCCH subframes for the UE to monitor when a retransmission is expected by the UE. The DRX inactivity timer may correspond to an amount of time before the UE may again enter the off duration following successfully decoding PDCCH. The amount of time may be in terms of a transmission time interval (TTI) duration. After a UE successfully receives downlink data, the DRX inactivity timer may start counting a number of subframes. If uplink or downlink data transmissions occur while the DRX inactivity timer is running, the timer restarts. If the DRX inactivity timer expires without uplink or downlink activity, the UE may enter the DRX cycle to achieve power savings. The UE may start with a short DRX cycle. The DRX short cycle may correspond to a first DRX cycle that the UE enters after successful expiration of DRX inactivity timer. FIG. 4 further illustrates an example 450 showing an example DRX short cycle. The UE may operate using the short DRX cycle until a DRX short cycle timer expires. Once the DRX short cycle expires, the UE may enter a long DRX cycle. The example 450 in FIG. 4 also illustrates an example DRX long cycle. A DRX short cycle timer may correspond to a number of consecutive subframes during which the UE follows the short DRX cycle after the DRX inactivity timer has expired. The UE may further be able to transition to an idle mode DRX based on an RRC inactivity timer.

The amount of power saving achieved by DRX may be improved based on the specific DRX configuration used. In some wireless communication systems, a UE may transmit a set of parameters in over-the air (OTA) UE assistance information (UAI) to the network (by transmitting the UAI to a base station) indicating the UE's preferred values for one or more of the DRX parameters. The set of parameters may include a UE's DRX preference for any of a long cycle, an inactivity timer, a short cycle, a short cycle timer, or the like. The UE's preferences may relate to a delay budget, overheating at the UE, DRX configuration, or the like. The UE may transmit the UAI in RRC signaling to the base station. The UAI may be may be encoded based on Abstract Syntax Notation One (ASN1) and may include the UE's DRX preference that relates to any of a long cycle, an inactivity timer, a short cycle, a short cycle timer, or the like. In some aspects, the DRX parameter for which the UE sends UAI may include any of an ON duration timer, a DRX inactivity timer, a DRX retransmission timer, a DRX UL retransmission timer, a long DRX cycle, a value of the DRX start offset, a DRX short cycle timer, and/or a short DRX cycle, among others. The base station may approve the requested DRX preference by transmitting an RRC reconfiguration to the UE with the requested DRX parameters after receiving the DRX preference from the UE.

In some situations, the UE's transmitted DRX preference may be not performing well. For example, the UE's DRX preference may be determined on a current traffic of one or more applications. However, the traffic may not be accurately determined and may change. As a result, one or more of the applications may experience performance issues such as latency, jitter or data stall. Aspects provided herein enables a UE to dynamically apply fallback DRX configurations by adjusting one or more parameters of a DRX configuration.

Figure 5:
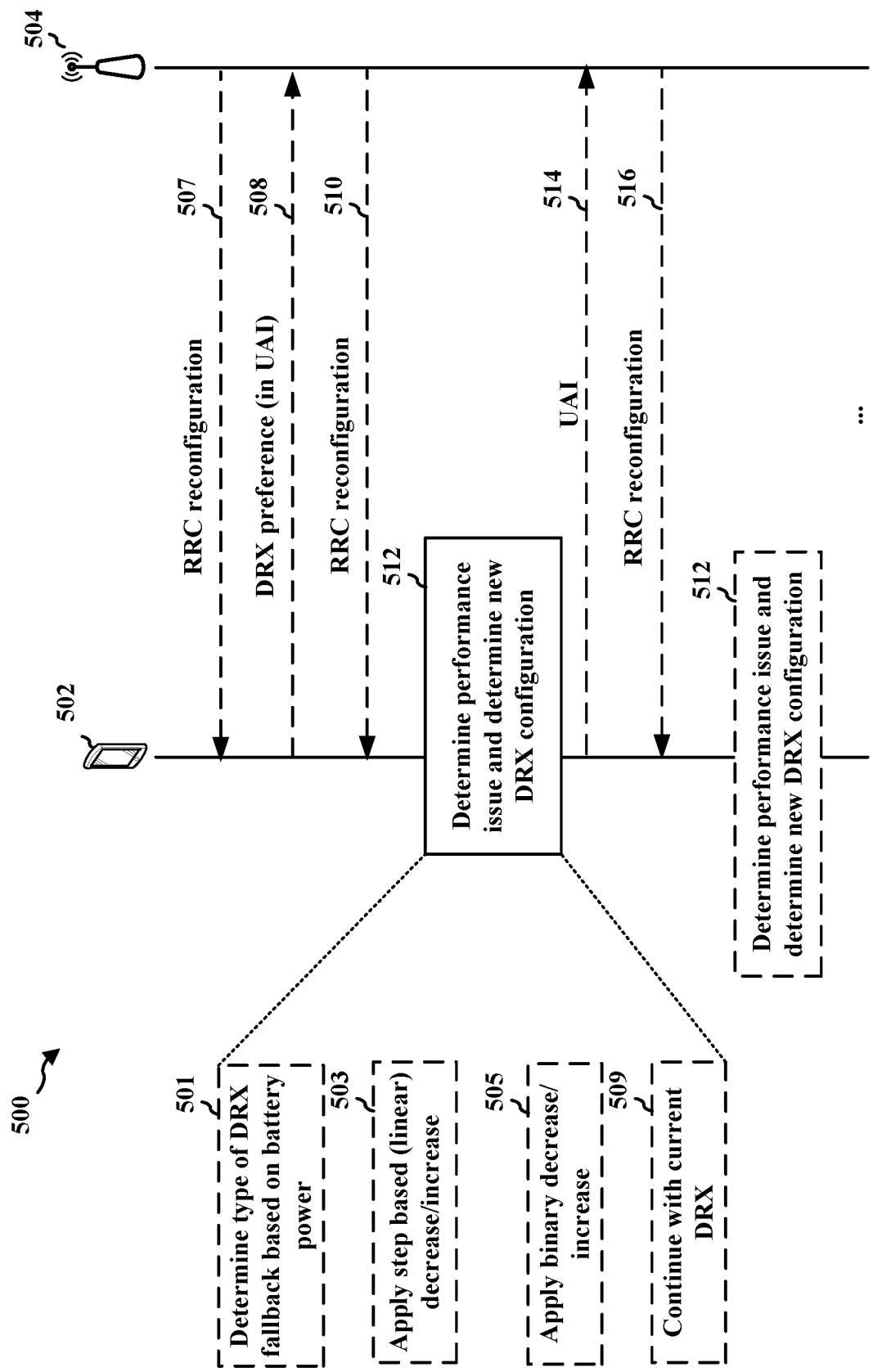
FIG. 5 is a diagram illustrating example communications between a UE and a base station.

FIG. 5 is a diagram 500 illustrating an example communication flow between a UE 502 and a base station 504. As illustrated in FIG. 5, the UE 502 may receive an RRC reconfiguration 507 from the base station 504. The RRC reconfiguration 507 may include a DRX configuration including one or more DRX parameters such as one or more of an ON duration timer, a DRX inactivity timer, a DRX retransmission timer, a DRX UL retransmission timer, a long DRX cycle, a value of the DRX start offset, a DRX short cycle timer, a short DRX cycle, or the like. The DRX configuration included in the RRC reconfiguration 507 may be referred as DRX1. The UE 502 may transmit a DRX preference 508 in UAI to the base station 504. In some aspects, the DRX preference 508 may include a preferred value for one or more timers and/or DRX parameter values. In some examples, the DRX preference 508 may include one or more DRX parameters such as one or more of an ON duration timer, a DRX inactivity timer, a DRX retransmission timer, a DRX UL retransmission timer, a long DRX cycle, a value of the DRX start offset, a DRX short cycle timer, a short DRX cycle, or the like, which may be different than the parameter(s) configured in DRX1. The base station 504 may apply the preference(s), or otherwise approve the request, by transmitting an RRC reconfiguration 510 including the one or more DRX parameters transmitted in the DRX preference 508. The DRX configuration with the parameters based on the UAI may be referred to as DRX2.

The UE 502 may apply the one or more DRX parameters transmitted in the DRX configuration in RRC reconfiguration 510. After the UE 502 applies one or more DRX parameters, such as the one or more DRX parameters in RRC reconfiguration 507 or 510, the UE 502 may experience application performance issues and accordingly re-determine a fallback DRX configuration at 512. In some aspects, 508 and 510 or 507 may be skipped before the UE performs DRX configuration fallback, e.g., at 512.

In some aspects, at 501, the UE 502 may determine whether to apply, and/or continue, a DRX fallback procedure based on a battery power level, e.g., such as whether the UE 502 has sufficient battery power left or not.

For example, if the UE 502 is in a high battery region 1, such as having a battery power level >40%, the UE 502 may proceed with fallback DRX procedure. In another example, if the UE 502 is in a battery region 2, such as having a battery power level greater than 5% and lower than 40%, the UE may proceed with the fallback DRX procedure with a reduced number of attempts. In another example, if the UE 502 is in a battery region 3, such as having a battery power level lower than 5%, the UE may skip performance of the fallback DRX procedure in order to not further drain the already low battery power, e.g., as illustrated at 509. The UE may continue to apply the current DRX configuration even if the UE receives a trigger for DRX fallback, such as an indication of poor application performance. The battery regions may be configurable, e.g., as one or more ranges or as one or more thresholds that the UE uses to determine whether to adjust a DRX configuration through a fallback DRX procedure.

In some aspects, the UE 502 may use a pre-determined amount (e.g., number) of attempts that the UE 502 might want to trigger fallback DRX configuration once a DRX configuration is configured. The number of attempts may be based on the battery power level of the UE in some aspects. When the UE 502 determines an application performance issue, such as by receiving performance report from an application layer in another layer, the UE may trigger the DRX fallback procedure. The performance report may be a type of report, or may include an indicator, that triggers the fallback DRX procedure. The type of report may be a report that indicates an application performance problem, such as jitter, latency, or data stall, or may merely indicate bad application performance. The UE may wait to receive a threshold number of application reports before triggering the fallback DRX procedure. For example, the UE may trigger the fallback procedure if N consecutive application performance reports indicating bad performance are received. The use of N may help to avoid frequent fluctuations in UAI requests from the UE. N may be an integer number and may be different for different battery power levels of the UE.

A DRX configuration may be considered to be non-preferred (which may be referred to as bad, non-optimal, or sub-optimal) if the UE receives N consecutive application performance reports indicating bad performance. As well, the UE may determine that the DRX configuration is a preferred (which may also be referred to as good, optimal, or more optimal) after receiving a number (M) of application performance reports for which the percentage of good performance reports is higher than a threshold. M may be equal to N in some aspects. As a non-limiting example, the threshold may be 90%, 80%, 75%, etc.

If the UE is in battery region 2, the UE may start the fallback procedure with the preferred DRX configuration and may further tune or adjust the DRX configuration. If the UE is in battery region 1, the UE may apply a DRX fallback procedure, and at the (N−1)th attempt may select the preferred DRX configuration, if available and not yet tuned. At the Nth attempt, the UE may select the DRX configuration that provides the least amount of battery savings.

Thus, if the UE is in battery region 2, the UE 502 may transmit UAI 514 by using DRX1 as a baseline. If the UE 502 is in battery region 1, the UE may transmit UAI 514 by using DRX2. At N−1th attempt, DRX1 may be transmitted in UAI 514 if the UE 502 did not previously experience bad application performance while applying DRX1. After the base station 504 approves the DRX configuration indicated in UAI 514, the UE 502 may re-determine application performance. If the application performance is still bad after the DRX configuration indicated in UAI 514 is approved, the UE 502 may choose the further power consuming DRX configuration, such as a DRX configuration with increased duration cycle.

In some aspects, the UE may use attempts that are based on a step size in DRX parameters, as shown at 503. The step size may be used to increase or decrease one or more parameters in the DRX configuration, such as long duration cycle, inactivity timer, short duration cycle, or the like, may be based on the number of preconfigured attempts. In some aspects, if the application performance is not bad (e.g. no reports of application performance issues are received), the UE 502 may stop the process of re-determining application performance and re-determining new DRX configuration. Alternatively, the UE 502 may further optimize the DRX configuration.

As one example, the UE 502 may be initially configured in RRC reconfiguration 507 with long duration cycle 1028 ms and inactivity timer 500 ms. The UE 502 may indicate long duration cycle 5120 ms and inactivity timer 100 ms in the DRX preference 508 which may be approved in the RRC reconfiguration 510. The UE 502 may then experience application performance issues. The UE 502 may accordingly transmit, in UAI 514, to indicate long duration cycle 1028 ms and inactivity timer 500 ms. If the UE 502 still experiences application performance issue after the long duration cycle 1028 ms and inactivity timer 500 ms in UAI 514 is approved in RRC reconfiguration 516, the UE 502 may adjust the DRX parameters (long duration cycle and inactivity timer) and retransmit a UAI. For example, the UE 502 may adjust the DRX parameters based on an incrementing or decrementing by a step size defined for the long duration cycle and inactivity timer. In some aspects, the step size may be based on a single index, e.g., a cycle duration index or an inactivity timer index. In other aspects, the step size may be based on multiple indices for a cycle duration length or inactivity timer. The step size for long duration cycle may be based on a number of remaining possible long duration cycles divided by the number of attempts N. The step size for long duration cycle may be based on a number of remaining possible long duration cycles divided by the number of attempts N. The step size for inactivity timer may be based on a number of remaining possible inactivity timers divided by the number of attempts N. Other DRX parameters previously described may be similarly re-determined.

In another example, instead of using increment or decrement, the UE 502 may apply binary search to find the optimal DRX configuration, e.g., as illustrated at 505. The number of attempts for the binary search may be configured and may be configured differently for battery region 1 and region 2. When the UE 502 determines application performance issue, such as by receiving bad performance report from an application layer in another layer, if DRX1 was configured before DRX2 was configured, if the UE is in battery region 2, the UE 502 may transmit UAI 514 by using DRX1 as a baseline. If the UE is in battery region 1, the UE may transmit UAI 514 by using DRX2. At $N-1^{th}$ attempt, DRX1 may be transmitted in UAI 514 if the UE 502 did not previously experience bad application performance while applying DRX 1. If the application performance is still bad after the DRX configuration indicated in UAI 514 is approved, the UE 502 may choose a further power consuming DRX configuration at half point for one or more DRX parameters, such as long duration cycle, inactivity timer, short cycle and short cycle duration. If the application performance is still bad after the further power consuming DRX configuration is approved by the base station 504 in another RRC reconfiguration, the UE 502 may again choose a further power consuming DRX configuration at half point for one or more DRX parameters. If the application performance is good, the UE 502 may choose a less power consuming DRX configuration at half point for one or more DRX parameters to find another configuration. The process may be stopped at a preconfigured amount of attempts N. If the application performance is good on attempt N, the one or more DRX parameters found on attempt N may be applied. If the application performance is bad on attempt N, the one or more DRX parameters may be reverted to the DRX parameters on the last attempt where the application performance is good.

As one example, the UE 502 may be initially configured in RRC reconfiguration 507 with long duration cycle 1028 ms and inactivity timer 500 ms. The UE 502 may indicate long duration cycle 5120 ms and inactivity timer 100 ms in the DRX preference 508 which may be approved in the RRC reconfiguration 510. The UE 502 may then experience application performance issues. The UE 502 may accordingly transmit, in UAI 514, to indicate long duration cycle 1028 ms and inactivity timer 500 ms. If the UE 502 still experiences application performance issue after the long duration cycle 1028 ms and inactivity timer 500 ms in UAI 514 is approved in RRC reconfiguration 516, the UE 502 may adjust the DRX parameters (long duration cycle and inactivity timer) and retransmit a UAI. The UE 502 may adjust the DRX parameters by performing binary search. For example, for long and short duration cycle, the UE 502 may reduce the long and short duration cycle to a half point between a current duration cycle and an initial duration cycle (e.g., the duration cycle 5120 ms) in a duration cycle index. An example long duration cycle index may be 10 ms, 20 ms, 30 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms, etc. In some aspects, the half point may be in between two entries in the index and the closest higher or lower entry may be accordingly selected. If the application performance is still bad after the UE 502 transmits UAI and receives approval based on the adjusted DRX parameters, the UE 502 may keep performing the binary search. If the application performance is good after the UE 502 transmits UAI and receives approval based on the adjusted DRX parameters, the UE 502 may still keep performing the binary search to search for a better DRX configuration. The process may be stopped at a preconfigured amount of attempts N. If the application performance is good on attempt N, the one or more DRX parameters found on attempt N may be applied. If the application performance is bad on attempt N, the one or more DRX parameters may be reverted to the DRX parameters on the last attempt where the application performance is good.

Figure 6:
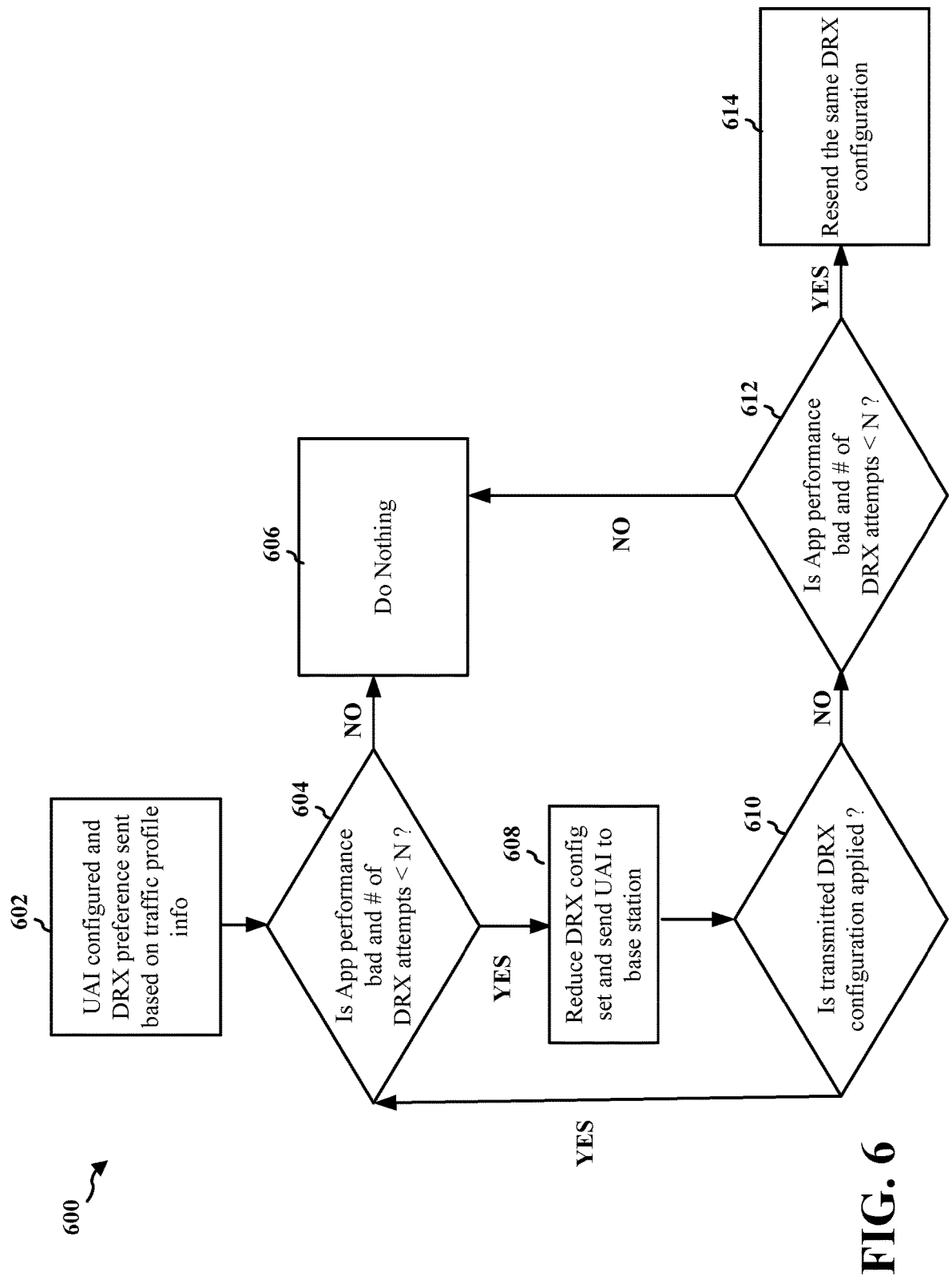
FIG. 6 is a flowchart illustrating a UE's procedure of determining DRX configuration.

In some aspects, upon detecting bad performance, the UE 502 may immediately transmit the most power consuming DRX configuration of DRX1 and DRX2 in UAI and retransmit the UAI until the DRX configuration is approved by the base station 504. FIG. 6 illustrates an example fallback DRX procedure 600 according to aspects of the present disclosure. At 602, the UE may transmit UAI with DRX preference(s) based on traffic profile information for one or more applications at the UE. At 604, the UE determines whether application performance for the one or more applications triggers fallback DRX, e.g., based on a report of poor application performance and a number of DRX attempts being less than a threshold number. If the UE does not determine to trigger the fallback DRX at 604, the UE may continue with the current DRX configuration, at 606. If the UE determines to trigger the fallback DRX procedure, at 604, the UE may adjust a DRX parameter (decrease/increase) and may send UAI with an indication of the adjustment, at 608. At 610, the UE determines whether the transmitted DRX configuration is applied by the base station. If so, the UE may return to step 604 to determine whether to further refine the DRX configuration. If the base station does not apply the adjusted DRX parameters, at 612, the UE may determine whether fallback DRX is triggered similar to the determination at 604. If so, the UE may resent the adjusted DRX configuration parameters indicated at 608. If not, the UE may continue with the current DRX configuration at 606. From 614, the process may continue to 610, where the UE may again determine whether the DRX configuration is applied by the base station.

Figure 7:
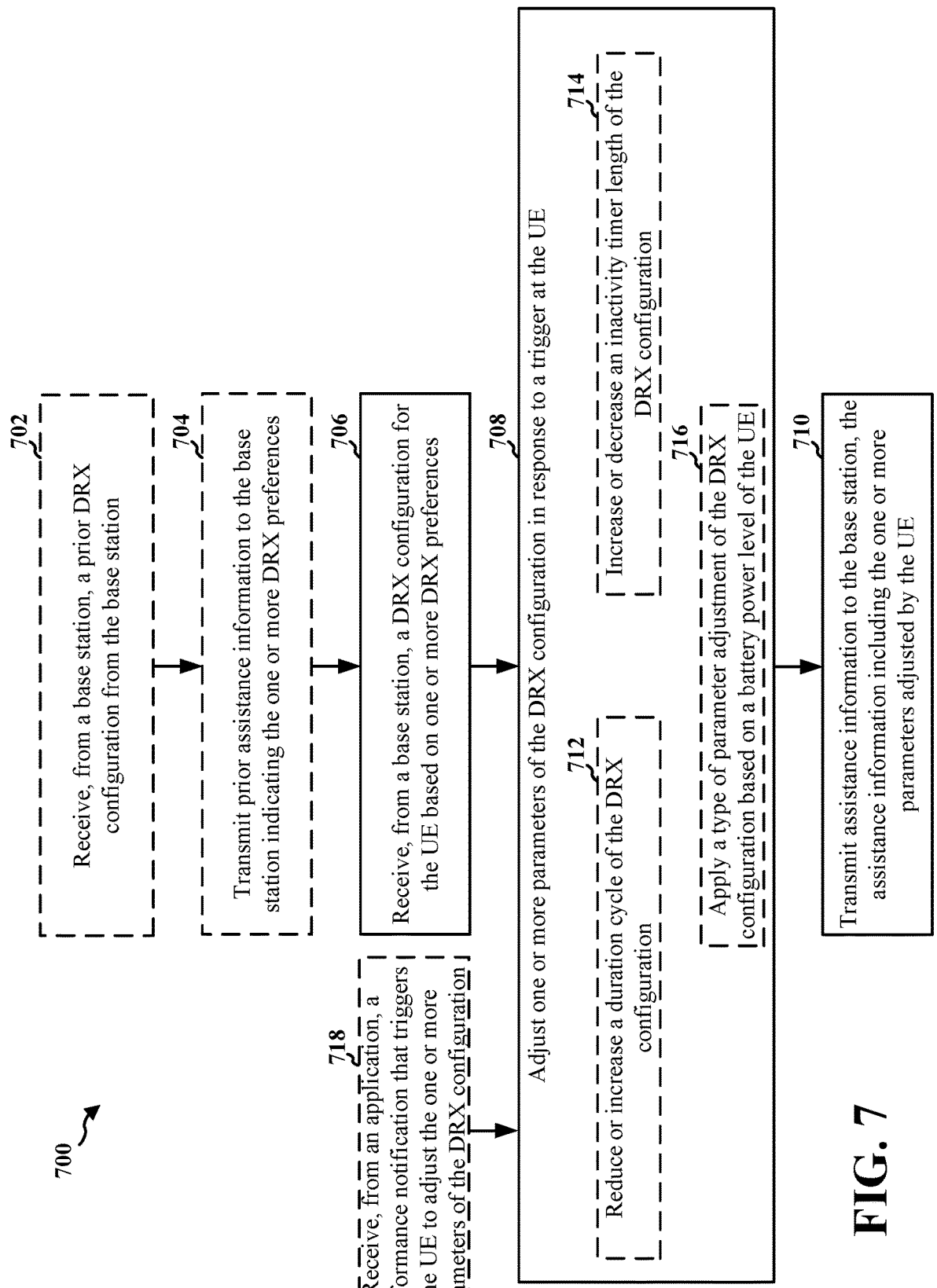
FIG. 7 is a flowchart of a method of wireless communication.

FIG. 7 is a flowchart 700 of a method of wireless communication. The method may be performed by a UE (e.g., the UE 104, the UE 502; the apparatus 902). Optional steps are illustrated in dashed lines. The steps are not necessarily illustrated in chronological order.

At 702, the UE may receive, from a base station, a prior DRX configuration from the base station. In some aspects, 702 may be performed by DRX configuration reception component 942 in FIG. 9. In some aspects, the prior DRX configuration may correspond with the RRC reconfiguration 507 in FIG. 5. In some aspects, the prior DRX configuration may be a prior CDRX configuration.

At 704, the UE may transmit prior assistance information to the base station indicating the one or more DRX preferences. In some aspects, 704 may be performed by UAI transmission component 946 in FIG. 9. In some aspects, the prior assistance information 704 may correspond with the UAI 508 in FIG. 5.

At 706, the UE may receive, from a base station, a DRX configuration for the UE based on one or more DRX preferences. In some aspects, 706 may be performed by DRX configuration reception component 942 in FIG. 9. In some aspects, the DRX configuration may correspond with the RRC reconfiguration 510 in FIG. 5. In some aspects, the DRX configuration may be a CDRX configuration.

At 708, the UE may adjust one or more parameters of the DRX configuration in response to a trigger at the UE. In some aspects, 708 may be performed by adjusting component 944 in FIG. 9. In some aspects, as part of 708, at 712, the UE may reduce or increase a duration cycle of the DRX configuration. In some aspects, reducing the duration cycle may include reducing the duration cycle by a step size, the step size corresponding to one or more cycle length indices. In some aspects, reducing the duration cycle may further include stopping additional reduction of the duration cycle if an application performance level is met. In some aspects, reducing the duration cycle may further include performing the additional reduction of the duration cycle by the step size if the application performance level is not met. In some aspects, the UE may increase the duration cycle after stopping the additional reduction of the duration cycle, to check for an improved cycle length. In some aspects, the step size corresponds to a single cycle length index. In some aspects, the step size corresponds to multiple cycle length indices. In some aspects, reducing the duration cycle includes reducing the duration cycle to a half point between a current duration cycle and an initial duration cycle. In some aspects, reducing the duration cycle further includes stopping additional reduction of the duration cycle if an application performance level is met. In some aspects, reducing the duration cycle further includes performing the additional reduction of the duration cycle by an additional half point if the application performance level is not met. In some aspects, the UE may increase the duration cycle, after stopping the additional reduction of the duration cycle, to check for an improved cycle length. In some aspects, reducing the duration cycle includes reducing the duration cycle to a shortest duration cycle length (such as shortest duration cycle in an index or a shortest duration cycle in the prior DRX configuration).

In some aspects, as part of 708, at 714, the UE may increase (or decrease) an inactivity timer length of the DRX configuration. In some aspects, increasing the inactivity timer length of the DRX configuration includes increasing the inactivity timer length by a step size, the step size corresponding to one or more inactivity timer length indices. In some aspects, increasing the inactivity timer length of the DRX configuration further includes stopping additional increase of the inactivity timer length if an application performance level is met. In some aspects, increasing the inactivity timer length of the DRX configuration further includes performing the additional increase of the inactivity timer length by the step size if the application performance level is not met. In some aspects, the step size corresponds to a single inactivity timer length index. In some aspects, the step size corresponds to multiple inactivity timer length indices. In some aspects, increasing the inactivity timer length includes increasing the inactivity timer length to a half point between a current inactivity timer length and a longest inactivity timer length. In some aspects, increasing the inactivity timer length further includes stopping additional increase of the inactivity timer length if an application performance level is met. In some aspects, increasing the inactivity timer length further includes performing the additional increase of the inactivity timer length by an additional half point if the application performance level is not met. In some aspects, adjusting the one or more parameters of the DRX configuration further includes decreasing the inactivity timer length, after stopping the additional increase of the inactivity timer length, to check for an improved inactivity timer length. In some aspects, increasing the inactivity timer length includes increasing the inactivity timer length to a longest inactivity timer length.

In some aspects, at 716, the UE may apply a type of parameter adjustment of the DRX configuration based on a battery power level of the UE. In some aspects, applying the type of parameter adjustments further includes applying a first number of parameter adjustments if the battery power level is in a first range. In some aspects, applying the type of parameter adjustments further includes applying a second number of parameter adjustments if the battery power level is in a second range, the second number being lower than the first number. In some aspects, applying the type of parameter adjustments further includes refraining from applying an adjustment if the battery power level is in a third range. In some aspects, the trigger at the UE is based on application performance.

In some aspects, to trigger the adjustment at 708, at 718, the UE may receive, from an application (such as from an application layer within the UE), a performance notification that triggers the UE to adjust the one or more parameters of the DRX configuration. In some aspects, trigger at the UE is based, at least in part, on one or more reports of a type of application performance within a timeframe. For example, the trigger may be N reports or one report within a defined timeframe. The report may indicate that the report is for the timeframe. For example, one report may indicate that the application performance is good for a timeframe (e.g., five seconds). In some aspects, 718 may be performed by application component 948 of FIG. 9.

Figure 8:
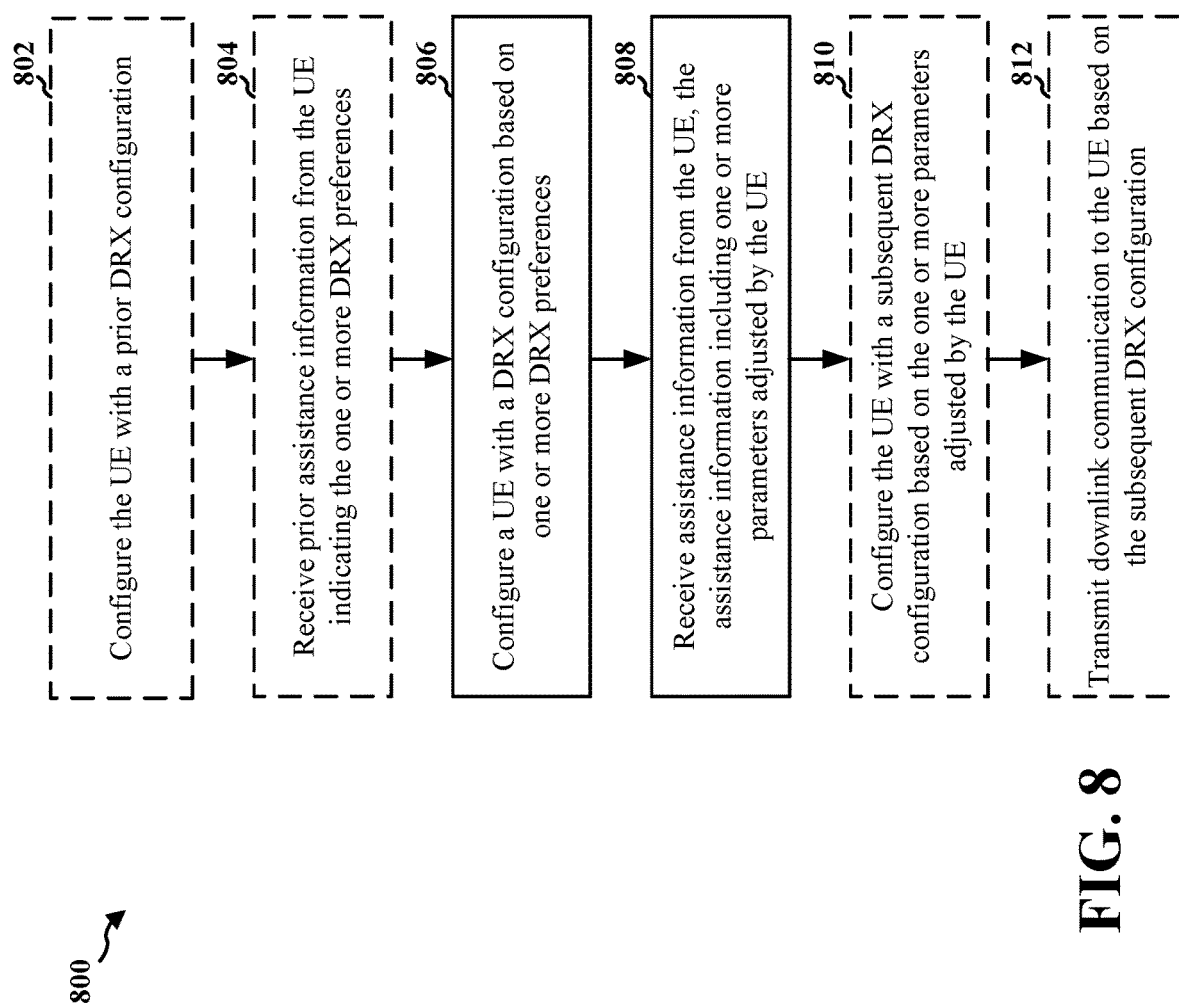
FIG. 8 is a flowchart of a method of wireless communication.

FIG. 8 is a flowchart 800 of a method of wireless communication. The method may be performed by a base station (e.g., the base station 102/180, the base station 504; the apparatus 1002. Optional steps are illustrated in dashed lines. The steps are not necessarily illustrated in chronological order.

At 802, the base station may configure the UE with a prior DRX configuration. In some aspects, 802 may be performed by DRX configuration component 1042 in FIG. 10. In some aspects, the prior DRX configuration may correspond with the RRC reconfiguration 507 in FIG. 5. In some aspects, the prior DRX configuration may be a prior CDRX configuration.

At 804, the base station may receive prior assistance information from the UE indicating the one or more DRX preferences. In some aspects, 804 may be performed by UAI reception component 1044 in FIG. 10. In some aspects, the prior assistance information may correspond with the UAI carrying the DRX preference 508 in FIG. 5.

At 806, the base station may configure a UE with a DRX configuration based on one or more DRX preferences. In some aspects, 802 may be performed by DRX configuration component 1042 in FIG. 10. In some aspects, the DRX configuration may correspond with the RRC reconfiguration 510 in FIG. 5. In some aspects, the DRX configuration may be a CDRX configuration.

At 808, the base station may receive assistance information from the UE, the assistance information including one or more parameters adjusted by the UE. In some aspects, 804 may be performed by UAI reception component 1044 in FIG. 10. In some aspects, the assistance information may correspond with the UAI 514 in FIG. 5.

At 810, the base station may configure the UE with a subsequent DRX configuration based on the one or more parameters adjusted by the UE. In some aspects, 802 may be performed by DRX configuration component 1042 in FIG. 10. In some aspects, the subsequent DRX configuration may correspond with the RRC reconfiguration 516 in FIG. 5.

At 812, the base station may transmit downlink communication to the UE based on the subsequent DRX configuration. In some aspects, 812 may be performed by DL component 1046 in FIG. 10.

Figure 9:
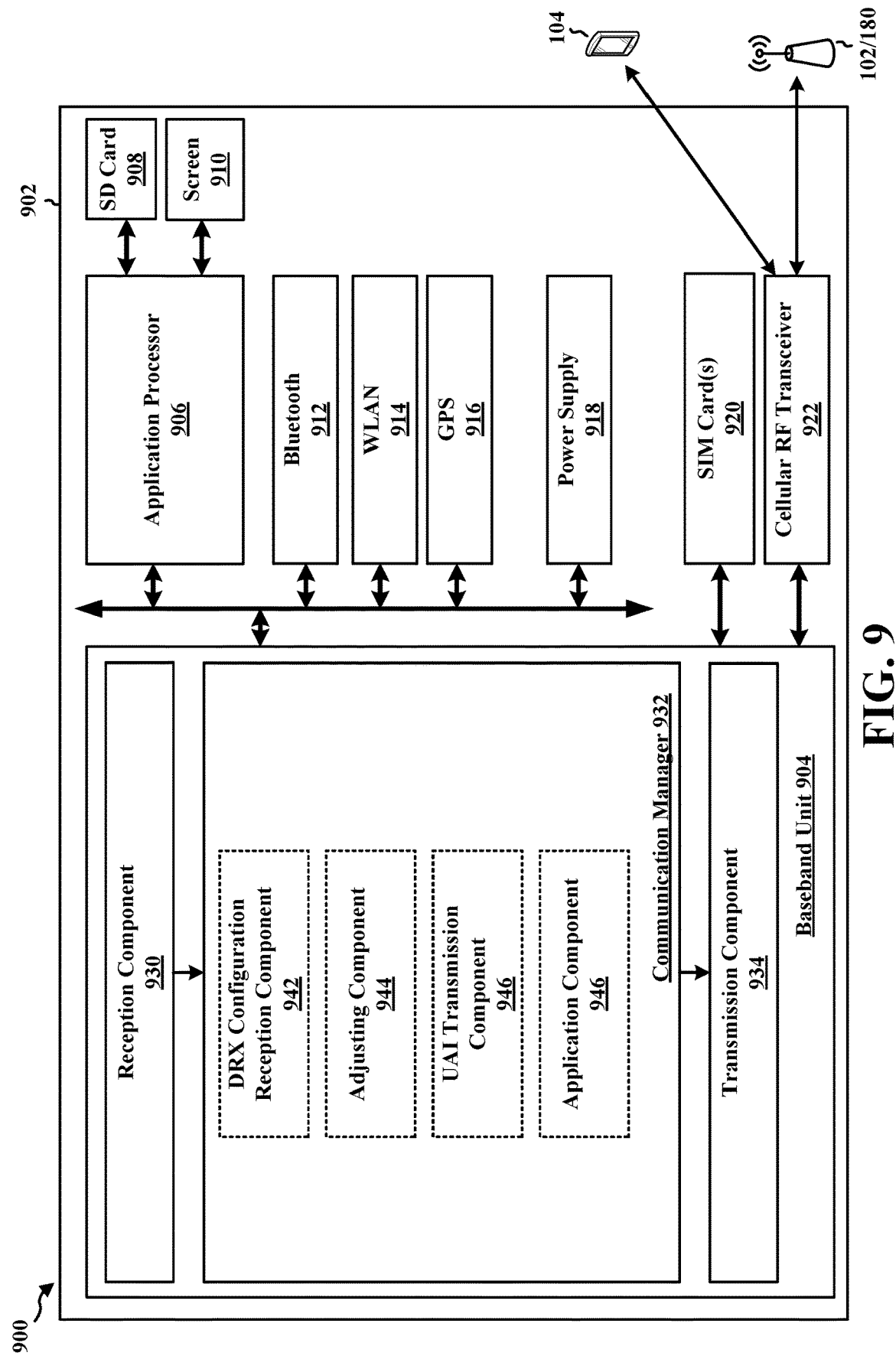
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a baseband unit 904, such as a cellular baseband processor (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The baseband unit 904 communicates through the cellular RF transceiver 922 with the UE 104 and/or BS 102/180. The baseband unit 904 may include a computer-readable medium/memory. The computer-readable medium/memory may be non-transitory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the UE 350 and may include the memory 360 and/or at least one of the TX processor 368, the RX processor 356, and the controller/processor 359. In one configuration, the apparatus 902 may be a modem chip and include just the baseband unit 904, and in another configuration, the apparatus 902 may be the entire UE (e.g., see 350 of FIG. 3) and include the aforediscussed additional modules of the apparatus 902.

The communication manager 932 may include a DRX configuration reception component 942 that may receive, from a base station, a prior DRX configuration from the base station, or receive, from a base station, a DRX configuration for the UE based on one or more DRX preferences, e.g., as described in connection with 702 and 706 in FIG. 7. The communication manager 932 may further include a component 944 that may adjust one or more parameters of the DRX configuration in response to a trigger at the UE, e.g., as described in connection with 708 in FIG. 7. The communication manager 932 may further include a UAI transmission component 946 that may transmit prior assistance information to the base station indicating the one or more DRX preferences or transmit assistance information to the base station, the assistance information including the one or more parameters adjusted by the UE, e.g., as described in connection with 704 and 710 in FIG. 7. The communication manager 932 may further include an application component 948 that may receive, from an application, a performance notification that triggers the UE to adjust the one or more parameters of the DRX configuration, e.g., as described in connection with 718 in FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a base station, a DRX configuration for the UE based on one or more DRX preferences. The baseband unit 904 may further include means for adjusting one or more parameters of the DRX configuration in response to a trigger at the UE. The baseband unit 904 may further include means for transmitting assistance information to the base station, the assistance information including the one or more parameters adjusted by the UE. The baseband unit 904 may further include means for receiving, from a base station, a prior DRX configuration from the base station. The baseband unit 904 may further include means for transmitting prior assistance information to the base station indicating the one or more DRX preferences, wherein the DRX configuration is received from the base station in response to the prior assistance information. The baseband unit 904 may further include means for reducing the duration cycle by a step size, the step size corresponding to one or more cycle length indices. The baseband unit 904 may further include means for stopping additional reduction of the duration cycle if an application performance level is met. The baseband unit 904 may further include means for performing the additional reduction of the duration cycle by the step size if the application performance level is not met. The baseband unit 904 may further include means for increasing the duration cycle after stopping the additional reduction of the duration cycle, to check for an improved cycle length. The baseband unit 904 may further include means for reducing the duration cycle to a half point between a current duration cycle and an initial duration cycle. The baseband unit 904 may further include means for stopping additional reduction of the duration cycle if an application performance level is met. The baseband unit 904 may further include means for performing the additional reduction of the duration cycle by an additional half point if the application performance level is not met. The baseband unit 904 may further include means for increasing the duration cycle, after stopping the additional reduction of the duration cycle, to check for an improved cycle length. The baseband unit 904 may further include means for reducing the duration cycle to a shortest duration cycle length. The baseband unit 904 may further include means for increasing the inactivity timer length by a step size, the step size corresponding to one or more inactivity timer length indices. The baseband unit 904 may further include means for stopping additional increase of the inactivity timer length if an application performance level is met. The baseband unit 904 may further include means for performing the additional increase of the inactivity timer length by the step size if the application performance level is not met. The baseband unit 904 may further include means for increasing the inactivity timer length to a half point between a current inactivity timer length and a longest inactivity timer length. The baseband unit 904 may further include means for stopping additional increase of the inactivity timer length if an application performance level is met. The baseband unit 904 may further include means for performing the additional increase of the inactivity timer length by an additional half point if the application performance level is not met. The baseband unit 904 may further include means for decreasing the inactivity timer length, after stopping the additional increase of the inactivity timer length, to check for an improved inactivity timer length. The baseband unit 904 may further include means for increasing the inactivity timer length to a longest inactivity timer length. The baseband unit 904 may further include means for applying a type of parameter adjustment of the DRX configuration based on a battery power level of the UE. The baseband unit 904 may further include means for applying a first number of parameter adjustments if the battery power level is in a first range. The baseband unit 904 may further include means for applying a second number of parameter adjustments if the battery power level is in a second range, the second number being lower than the first number. The baseband unit 904 may further include means refraining from applying an adjustment if the battery power level is in a third range. The baseband unit 904 may further include means for receiving, from an application, a performance notification that triggers the UE to adjust the one or more parameters of the DRX configuration.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
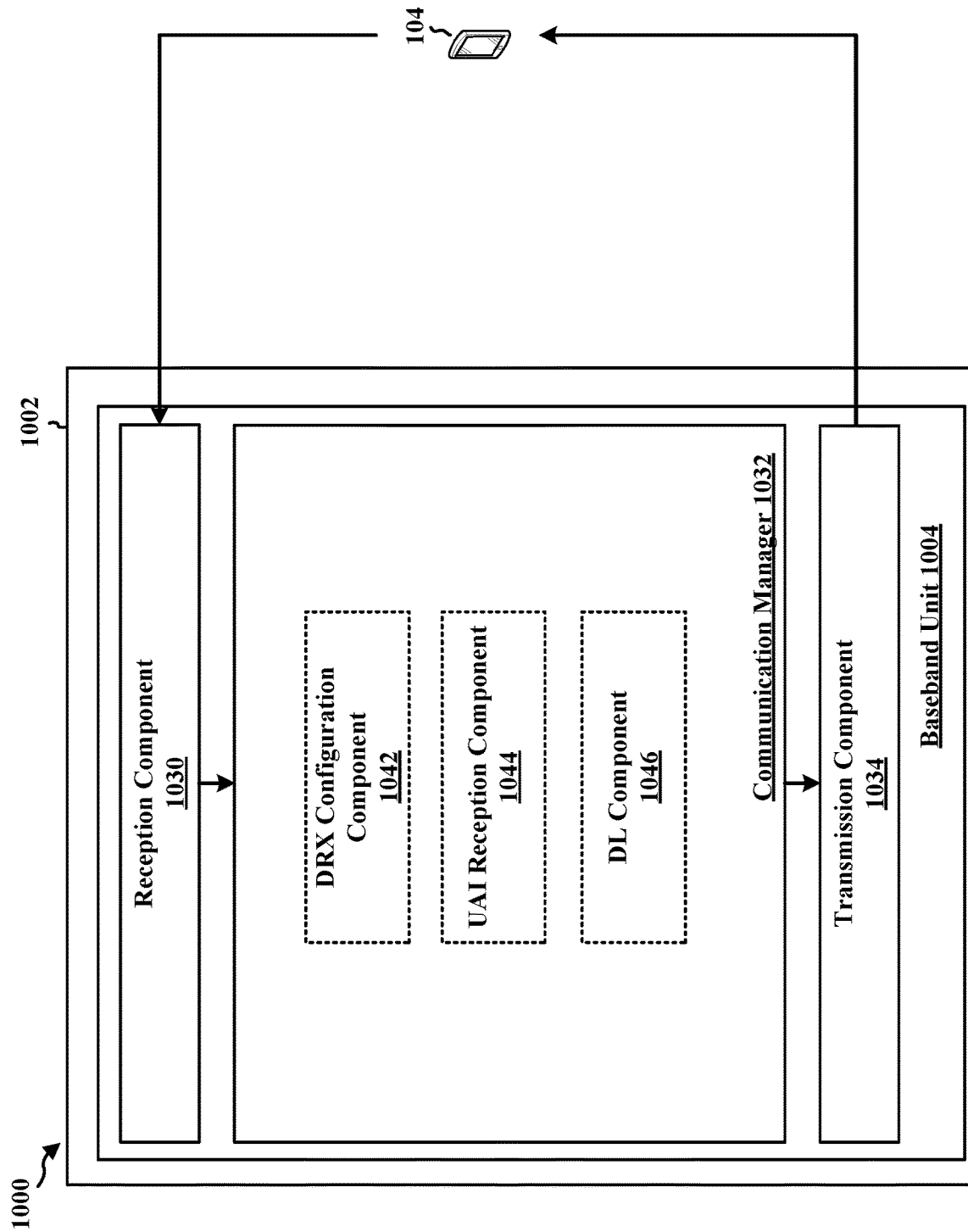
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 may include a DRX configuration component 1042 that may configure a UE with a DRX configuration based on one or more DRX preferences, configure the UE with a prior DRX configuration, or configure the UE with a subsequent DRX configuration based on the one or more parameters adjusted by the UE, e.g., as described in connection with 802, 806, and 810 in FIG. 8. The communication manager 1032 may further include a UAI reception component 1044 that may receive prior assistance information from the UE indicating the one or more DRX preferences or receive assistance information from the UE, the assistance information including one or more parameters adjusted by the UE, e.g., as described in connection with 804 and 808 in FIG. 8. The communication manager 1032 may further include a DL component 1046 that may transmit downlink communication to the UE based on the subsequent DRX configuration, e.g., as described in connection with 812 in FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for configuring a UE with a DRX configuration based on one or more DRX preferences. The baseband unit 1004 may further include means for receiving assistance information from the UE, the assistance information including one or more parameters adjusted by the UE. The baseband unit 1004 may further include means for configuring the UE with a prior DRX configuration. The baseband unit 1004 may further include means for receiving prior assistance information from the UE indicating the one or more DRX preferences. The baseband unit 1004 may further include means for configuring the UE with a subsequent DRX configuration based on the one or more parameters adjusted by the UE. The baseband unit 1004 may further include means for transmitting downlink communication to the UE based on the subsequent DRX configuration.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative and may be combined with other aspects or teachings described herein, without limitation.

Aspect 1 is a method of wireless communication at a UE, comprising: receiving, from a base station, a DRX configuration for the UE based on one or more DRX preferences; adjusting one or more parameters of the DRX configuration in response to a trigger at the UE; and transmitting assistance information to the base station, the assistance information including the one or more parameters adjusted by the UE.

Aspect 2 is the method of aspect 1, further comprising: receiving, from a base station, a prior DRX configuration from the base station; and transmitting prior assistance information to the base station indicating the one or more DRX preferences, wherein the DRX configuration is received from the base station in response to the prior assistance information.

Aspect 3 is the method of any of aspects 1-2, wherein adjusting the one or more parameters of the DRX configuration includes reducing or increasing a duration cycle of the DRX configuration.

Aspect 4 is the method of any of aspects 1-3, wherein reducing the duration cycle comprises: reducing the duration cycle by a step size, the step size corresponding to one or more cycle length indices; stopping additional reduction of the duration cycle if an application performance level is met; and performing the additional reduction of the duration cycle by the step size if the application performance level is not met.

Aspect 5 is the method of any of aspects 1-4, further comprising: increasing the duration cycle after stopping the additional reduction of the duration cycle, to check for an improved cycle length.

Aspect 6 is the method of any of aspects 1-5, wherein the step size corresponds to a single cycle length index.

Aspect 7 is the method of any of aspects 1-5, wherein the step size corresponds to multiple cycle length indices.

Aspect 8 is the method of any of aspects 1-7, wherein reducing the duration cycle includes: reducing the duration cycle to a half point between a current duration cycle and an initial duration cycle; stopping additional reduction of the duration cycle if an application performance level is met; and performing the additional reduction of the duration cycle by an additional half point if the application performance level is not met.

Aspect 9 is the method of any of aspects 1-8, wherein adjusting the one or more parameters of the DRX configuration further includes: increasing the duration cycle, after stopping the additional reduction of the duration cycle, to check for an improved cycle length.

Aspect 10 is the method of any of aspects 1-9, wherein reducing the duration cycle includes: reducing the duration cycle to a shortest duration cycle length.

Aspect 11 is the method of any of aspects 1-10, wherein adjusting the one or more parameters of the DRX configuration includes increasing an inactivity timer length of the DRX configuration.

Aspect 12 is the method of any of aspects 1-11, wherein increasing the inactivity timer length of the DRX configuration comprises: increasing the inactivity timer length by a step size, the step size corresponding to one or more inactivity timer length indices; stopping additional increase of the inactivity timer length if an application performance level is met; and performing the additional increase of the inactivity timer length by the step size if the application performance level is not met.

Aspect 13 is the method of any of aspects 1-12, wherein the step size corresponds to a single inactivity timer length index.

Aspect 14 is the method of any of aspects 1-12, wherein the step size corresponds to multiple inactivity timer length indices.

Aspect 15 is the method of any of aspects 1-11, wherein increasing the inactivity timer length includes: increasing the inactivity timer length to a half point between a current inactivity timer length and a longest inactivity timer length; stopping additional increase of the inactivity timer length if an application performance level is met; and performing the additional increase of the inactivity timer length by an additional half point if the application performance level is not met.

Aspect 16 is the method of any of aspects 1-15, wherein adjusting the one or more parameters of the DRX configuration further includes: decreasing the inactivity timer length, after stopping the additional increase of the inactivity timer length, to check for an improved inactivity timer length.

Aspect 17 is the method of any of aspects 1-16, wherein increasing the inactivity timer length includes: increasing the inactivity timer length to a longest inactivity timer length.

Aspect 18 is the method of any of aspects 1-17, further comprising: applying a type of parameter adjustment of the DRX configuration based on a battery power level of the UE.

Aspect 19 is the method of any of aspects 1-18, wherein applying the type of parameter adjustments includes: applying a first number of parameter adjustments if the battery power level is in a first range; applying a second number of parameter adjustments if the battery power level is in a second range, the second number being lower than the first number; and refraining from applying an adjustment if the battery power level is in a third range.

Aspect 20 is the method of any of aspects 1-19, wherein the trigger at the UE is based on application performance.

Aspect 21 is the method of any of aspects 1-20, further comprising: receiving, from an application, a performance notification that triggers the UE to adjust the one or more parameters of the DRX configuration.

Aspect 22 is the method of any of aspects 1-21, wherein the trigger at the UE is based, at least in part, on one or more reports of a type of application performance within a timeframe.

Aspect 23 is the method of any of aspects 1-22, wherein the DRX configuration is a CDRX configuration.

Aspect 24 is a method of wireless communication at a base station, comprising: configuring a UE with a DRX configuration based on one or more DRX preferences; and receiving assistance information from the UE, the assistance information including one or more parameters adjusted by the UE.

Aspect 25 is the method of aspect 24, further comprising: configuring the UE with a prior DRX configuration; and receiving prior assistance information from the UE indicating the one or more DRX preferences.

Aspect 26 is the method of any of aspects 24-25, further comprising: configuring the UE with a subsequent DRX configuration based on the one or more parameters adjusted by the UE; and transmitting downlink communication to the UE based on the subsequent DRX configuration.

Aspect 27 is the method of any of aspects 24-26, wherein the one or more parameters are adjusted with a step based decrease of a cycle duration or increase of an inactivity timer length.

Aspect 28 is the method of any of aspects 24-27, wherein the one or more parameters are adjusted with a half-point based parameter adjustment to decrease a cycle duration or increase an inactivity timer length.

Aspect 29 is the method of any of aspects 24-28, wherein the one or more parameters are adjusted to one or more of a lowest cycle duration or a longest inactivity timer.

Aspect 30 is the method of any of aspects 24-29, wherein the DRX configuration is a CDRX configuration.

Aspect 31 is an apparatus for wireless communication including at least one processor coupled to a memory and configured to implement a method as in any of aspects 1 to 23.

Aspect 32 is an apparatus for wireless communication including at least one processor coupled to a memory and configured to implement a method as in any of aspects 24 to 30.

Aspect 33 is an apparatus for wireless communication including means for implementing a method as in any of aspects 1 to 23.

Aspect 34 is an apparatus for wireless communication including means for implementing a method as in any of aspects 24 to 30.

Aspect 35 is a computer-readable medium storing computer executable code, where the code when executed by a processor causes the processor to implement a method as in any of aspects 1 to 23.

Aspect 36 is a computer-readable medium storing computer executable code, where the code when executed by a processor causes the processor to implement a method as in any of aspects 24 to 30.

What is claimed is:

1. An apparatus for wireless communication at a user equipment (UE), comprising:
   memory; and
   at least one processor coupled to the memory and configured to cause the UE to:
      receive a discontinuous reception (DRX) configuration for the UE based on one or more DRX preferences;
      adjust one or more parameters of the DRX configuration in response to a trigger at the UE, wherein, to adjust the one or more parameters of the DRX configuration, the at least one processor is further configured to:
         reduce a duration cycle by a first step size, the first step size corresponding to one or more cycle length indices,
         stop additional reduction of the duration cycle if an application performance level is met, and
         perform the additional reduction of the duration cycle by the first step size if the application performance level is not met; and
      transmit assistance information the assistance information including the one or more parameters adjusted by the UE.

2. The apparatus of claim 1, wherein the at least one processor is further configured to cause the UE to:
   receive a prior DRX configuration; and
   transmit prior assistance information indicating the one or more DRX preferences, wherein the DRX configuration is received in response to the prior assistance information.

3. The apparatus of claim 1, wherein the at least one processor is further configured to cause the UE to:
increase the duration cycle after stopping the additional reduction of the duration cycle, to check for an improved cycle length.

4. The apparatus of claim 1, wherein the first step size corresponds to a single cycle length index.

5. The apparatus of claim 1, wherein the first step size corresponds to multiple cycle length indices.

6. The apparatus of claim 1, wherein to adjust the one or more parameters of the DRX configuration in response to the trigger, the at least one processor is further configured to cause the UE to:
reduce the duration cycle to a first half point between a current duration cycle and an initial duration cycle;
stop the additional reduction of the duration cycle if the application performance level is met; and
perform the additional reduction of the duration cycle by an additional first half point if the application performance level is not met.

7. The apparatus of claim 6, wherein to adjust the one or more parameters of the DRX configuration, the at least one processor is further configured to cause the UE to:
increase the duration cycle, after stopping the additional reduction of the duration cycle, to check for an improved cycle length.

8. The apparatus of claim 1, wherein to adjust the one or more parameters of the DRX configuration in response to the trigger, the at least one processor is further configured to cause the UE to:
reduce the duration cycle to a shortest duration cycle length.

9. The apparatus of claim 1, wherein the trigger at the UE is based on application performance.

10. The apparatus of claim 9, wherein the at least one processor is further configured to cause the UE to:
receive, from a UE application, a performance notification that triggers the UE to adjust the one or more parameters of the DRX configuration.

11. The apparatus of claim 1, wherein the trigger at the UE is based, at least in part, on one or more reports of a second type of application performance within a timeframe.

12. The apparatus of claim 1, wherein the DRX configuration is a connected mode DRX (CDRX) configuration.

13. The apparatus of claim 1, wherein the memory and the at least one processor are further configured to:
apply a type of parameter adjustment of the DRX configuration based on a battery power level of the UE.

14. The apparatus of claim 13, wherein to apply the type of the parameter adjustment, the memory and the at least one processor are further configured to cause the UE to:
apply a first number of parameter adjustments if the battery power level is in a first range;
apply a second number of parameter adjustments if the battery power level is in a second range, the second number being lower than the first number; and
refrain from applying an adjustment if the battery power level is in a third range.

15. An apparatus for wireless communication at a user equipment (UE), comprising:
memory; and
at least one processor coupled to the memory and configured to cause the UE to:
receive a discontinuous reception (DRX) configuration for the UE based on one or more DRX preferences;
adjust one or more parameters of the DRX configuration in response to a trigger at the UE, wherein to adjust the one or more parameters of the DRX configuration in response to the trigger, the at least one processor is further configured to:
increase an inactivity timer length of the DRX configuration by a second step size, the second step size corresponding to one or more inactivity timer length indices;
stop additional increase of the inactivity timer length if an application performance level is met; and
perform the additional increase of the inactivity timer length by the second step size if the application performance level is not met.

16. The apparatus of claim 15, wherein the second step size corresponds to a single inactivity timer length index.

17. The apparatus of claim 15, wherein the second step size corresponds to multiple inactivity timer length indices.

18. The apparatus of claim 15, wherein to adjust the one or more parameters of the DRX configuration in response to the trigger, the at least one processor is further configured to cause the UE to:
increase the inactivity timer length to a second half point between a current inactivity timer length and a longest inactivity timer length;
stop the additional increase of the inactivity timer length if the application performance level is met; and
perform the additional increase of the inactivity timer length by an additional second half point if the application performance level is not met.

19. The apparatus of claim 18, wherein to adjust the one or more parameters of the DRX configuration, the at least one processor is further configured to cause the UE to:
decrease the inactivity timer length, after stopping the additional increase of the inactivity timer length, to check for an improved inactivity timer length.

20. The apparatus of claim 15, wherein to increase the inactivity timer length, the at least one processor is further configured to cause the UE to:
increase the inactivity timer length to a longest inactivity timer length.

21. A method of wireless communication at a user equipment (UE), comprising:
receiving a discontinuous reception (DRX) configuration for the UE based on one or more DRX preferences;
adjusting one or more parameters of the DRX configuration in response to a trigger at the UE, wherein adjusting the one or more parameters of the DRX configuration includes:
reducing a duration cycle by a first step size, the first step size corresponding to one or more cycle length indices,
stopping additional reduction of the duration cycle if an application performance level is met, and
performing the additional reduction of the duration cycle by the first step size if the application performance level is not met; and
transmitting assistance information, the assistance information including the one or more parameters adjusted by the UE.

22. The method of claim 21, further comprising:
receiving a prior DRX configuration; and
transmitting prior assistance information indicating the one or more DRX preferences, wherein the DRX configuration is received in response to the prior assistance information.

23. The method of claim 21, further comprising:
increasing the duration cycle after stopping the additional reduction of the duration cycle, to check for an improved cycle length.

24. The method of claim 21, wherein the first step size corresponds to a single cycle length index.

25. The method of claim 21, wherein the first step size corresponds to multiple cycle length indices.

26. The method of claim 21, wherein adjusting the one or more parameters of the DRX configuration in response to the trigger comprises:
reducing the duration cycle to a first half point between a current duration cycle and an initial duration cycle;
stopping the additional reduction of the duration cycle if the application performance level is met; and
performing the additional reduction of the duration cycle by an additional first half point if the application performance level is not met.

27. The method of claim 26, wherein adjusting the one or more parameters of the DRX configuration further comprises:
increasing the duration cycle, after stopping the additional reduction of the duration cycle, to check for an improved cycle length.

28. The method of claim 21, wherein adjusting the one or more parameters of the DRX configuration in response to the trigger comprises:
reducing the duration cycle to a shortest duration cycle length.

29. A method of wireless communication at a user equipment (UE), comprising:
receiving a discontinuous reception (DRX) configuration for the UE based on one or more DRX preferences;
adjusting one or more parameters of the DRX configuration in response to a trigger at the UE, wherein adjusting the one or more parameters of the DRX configuration in response to the trigger comprises:
increasing an inactivity timer length of the DRX configuration by a second step size, the second step size corresponding to one or more inactivity timer length indices;
stopping additional increase of the inactivity timer length if an application performance level is met; and
performing the additional increase of the inactivity timer length by the second step size if the application performance level is not met.

30. The method of claim 29, wherein the second step size corresponds to a single inactivity timer length index.

31. The method of claim 29, wherein the second step size corresponds to multiple inactivity timer length indices.

32. The method of claim 29, wherein adjusting the one or more parameters of the DRX configuration in response to the trigger further comprises:
increasing the inactivity timer length to a second half point between a current inactivity timer length and a longest inactivity timer length;
stopping the additional increase of the inactivity timer length if the application performance level is met; and
performing the additional increase of the inactivity timer length by an additional second half point if the application performance level is not met.

33. The method of claim 32, wherein adjusting the one or more parameters of the DRX configuration further comprises:
decreasing the inactivity timer length, after stopping the additional increase of the inactivity timer length, to check for an improved inactivity timer length.

34. The method of claim 29, wherein increasing the inactivity timer length further comprises:
increasing the inactivity timer length to a longest inactivity timer length.

\* \* \* \* \*